July 12, 1927.

A. BROSNICK

FLOWER BOX

Filed Dec. 12, 1925

1,635,203

Inventor
A. Brosnick.
By
Attorneys

Patented July 12, 1927.

1,635,203

UNITED STATES PATENT OFFICE.

ANDREW BROSNICK, OF NEW DERRY, PENNSYLVANIA.

FLOWER BOX.

Application filed December 12, 1925. Serial No. 75,020.

This invention relates to improvements in flower boxes and has as its general object to provide a flower box of such construction as to promote the healthy growth of flowers or plants.

Another object of the invention is to provide a flower box so constructed as to permit air to readily reach the roots of the flowers or plants and thus promote their rapid and healthy growth.

Another object of the invention is to provide a flower box of such construction that the soil contained therein may readily absorb moisture and in a more uniform manner than in ordinary flower boxes.

Another object of the invention is to provide a flower box which will not be subject to deterioration from the moisture present therein and which will not be liable to leak and will likewise be attractive in appearance.

Figure 1:
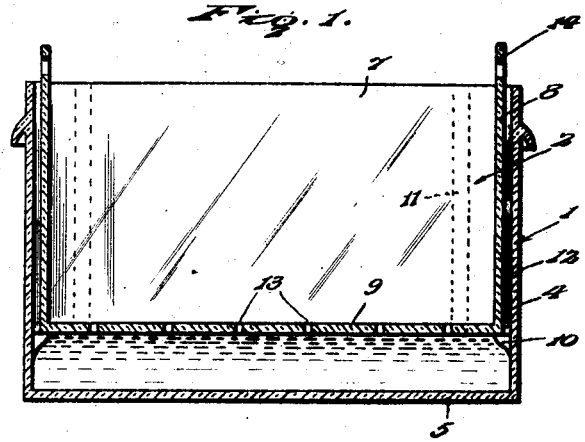
Figure 1 is a vertical longitudinal sectional view through the flower box embodying the invention.
Figure 2:
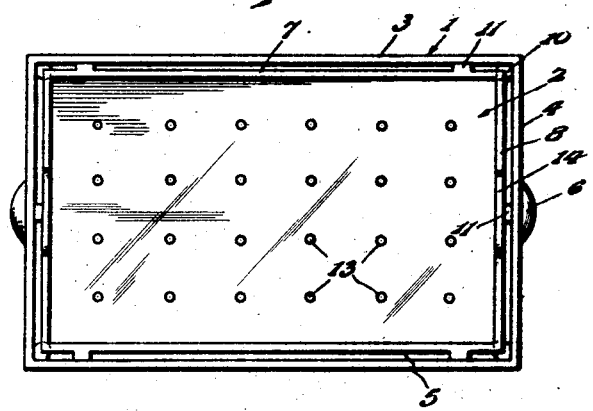
Figure 2 is a top plan view thereof.
Figure 3:
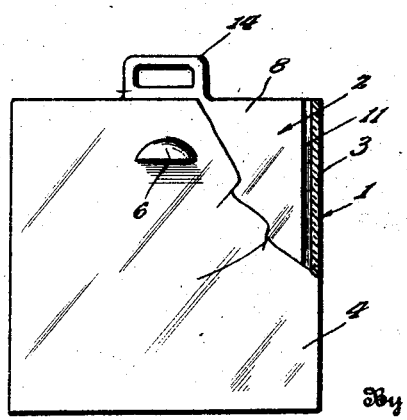
Figure 3 is a view in end elevation, a portion of the outer container of the box being broken away and a part being shown in section.

The flower box embodying the invention comprises an outer container indicated in general by the numeral 1, and an inner container indicated in general by the numeral 2, and the outer container is designed to contain water for supplying moisture to the soil which is within the inner container 2, the said outer container likewise housing the inner container. Both containers are preferably made of glass or other vitreous material and both containers are preferably of rectangular form although they may assume some other shape if found desirable. The outer container comprises side walls 3, end walls 4, and a bottom 5, and the same is provided upon the outer sides of its end walls with integral handles indicated by the numeral 6 adapting the flower box as a whole to be readily lifted and moved from place to place.

The inner container 2 comprises side walls 7, end walls 8, and a bottom 9, and this container is of slightly smaller dimensions, exteriorly, than the interior dimensions of the container 1, and is designed to rest at the corners of its bottom 9 upon supporting lugs 10 which are integrally formed in the corners of the container 1 between the side and end walls thereof, at points suitably spaced above the bottom 5 of the said container 1. Vertically extending ribs 11 are formed upon the outer surfaces of the side and end walls 7 and 8 of the container 2 and, by contacting the inner surfaces of the corresponding walls of the container 1, serve to space the walls of the container 2 from the walls of the container 1, a sufficient distance to provide a space 12 through which air may circulate. The bottom 9 of the inner container 2 is formed with a plurality of perforations 13 which are sufficiently large to provide for the passage of moisture and air upwardly through the bottom 9 and to be absorbed by the soil contained within the said inner container 2, it being understood that the soil and the growing plants are arranged within this container. The end walls 8 of the container 2 are provided at their upper edges with handles 14 adapting the inner container to be lifted out of the outer container 1 or lowered into the same.

In the use of the flower box, the inner conainer 2 is filled with earth in which the plants to be propagated are rooted either by transplanting or by the planting of seeds in the soil, and water is poured into the outer container 1 until the water level is slightly below the bottom 9 of the inner container 2. The ribs 11 upon the outer surfaces of the walls 7 and 8 of the container 2 serve to equi-distantly space the walls of the said container from the corresponding walls of the outer container and thus air is permitted to circulate through the space between the walls and over the surface of the water in the outer container, thereby evaporating the water and permitting the soil within the inner container to absorb the moisture thus created. In this manner, the soil is kept in a moist state and air is supplied to the roots of the flowers or plants, thereby materially facilitating their growth and keeping them in a healthy state at all times. An advantage in forming the containers, or at least the outer container, of glass, is that the water level therein may be readily observed at all times. Furthermore, both containers, being made of glass or other vitreous material, there is no deterioration of either container and the exterior of the container 2 and both the exterior and interior of the container 1 may be kept in a cleanly condition.

Having thus described the invention, what I claim is:

A rectangular flower box comprising an outer container for water having lugs within its corners disposed above the bottom thereof, an inner soil container removably mounted in the outer container and having handles upon its upper edge, the bottom of the inner container being adapted to rest upon the lugs to hold said bottom spaced above the bottom of the outer container and the handles above the upper edge of the outer container, and ribs carried by the outer walls of the inner container for engaging the inner surfaces of the outer container to space said container to provide an air space about the inner container.

In testimony whereof I affix my signature.

ANDREW BROSNICK. [L. S.]